(12) United States Patent
Li

(10) Patent No.: US 9,041,878 B2
(45) Date of Patent: May 26, 2015

(54) BACKLIGHT MODULE AND LCD DEVICE

(71) Applicant: SHENZHEN CHINA STAR OPTOELECTRONICS TECHNOLOGY CO., LTD., Shenzhen (CN)

(72) Inventor: Quan Li, Shenzhen (CN)

(*) Notice: Subject to any disclaimer, the term of this patent is extended or adjusted under 35 U.S.C. 154(b) by 305 days.

(21) Appl. No.: 13/807,181

(22) PCT Filed: Nov. 22, 2012

(86) PCT No.: PCT/CN2012/085057
§ 371 (c)(1),
(2) Date: Dec. 27, 2012

(87) PCT Pub. No.: WO2014/075329
PCT Pub. Date: May 22, 2014

(65) Prior Publication Data
US 2014/0132885 A1    May 15, 2014

(30) Foreign Application Priority Data

Nov. 13, 2012 (CN) .......................... 2012 1 0452564

(51) Int. Cl.
*F21V 8/00* (2006.01)
*G02F 1/1335* (2006.01)
*G02F 1/1333* (2006.01)

(52) U.S. Cl.
CPC ........ *G02B 6/0011* (2013.01); *G02F 1/133615* (2013.01); *G02F 1/133308* (2013.01); *G02F 2001/133317* (2013.01); *G02B 6/0093* (2013.01)

(58) Field of Classification Search
CPC ................ G02B 6/0011; G02B 6/0093; G02F 1/133615; G02F 1/133308; G02F 2001/133317
USPC ................................ 349/58–60; 362/632–634
See application file for complete search history.

(56) References Cited

U.S. PATENT DOCUMENTS

| | | | |
|---|---|---|---|
| 2001/0050731 A1 | 12/2001 | An et al. | |
| 2002/0044437 A1 | 4/2002 | Lee | |
| 2011/0037920 A1* | 2/2011 | Kim et al. | ........................ 349/58 |
| 2012/0236228 A1* | 9/2012 | Tang | ................................ 349/61 |
| 2012/0257335 A1 | 10/2012 | Iwai et al. | |

FOREIGN PATENT DOCUMENTS

| | | |
|---|---|---|
| CN | 101589276 A | 11/2009 |
| CN | 101709841 A | 5/2010 |
| CN | 101871596 A | 10/2010 |

(Continued)

OTHER PUBLICATIONS

Dai Yunli, the International Searching Authority written comments, Aug. 2013, CN.

*Primary Examiner* — Richard Kim
*Assistant Examiner* — Kendrick Hsu

(57) ABSTRACT

A liquid crystal display (LCD) device and a backlight module. The backlight module includes a lightbar, a lightbar heat sink, and a light guide panel (LGP). A light coupling distance is set between the lightbar and the LGP. The backlight module further includes a control structure controlling the light coupling distance. The lightbar is configured with a through hole, the control structure penetrating through the through hole is arranged on the lightbar heat sink, and the lightbar heat sink provides a fixing force that controls a position the LGP.

18 Claims, 2 Drawing Sheets

(56) References Cited

FOREIGN PATENT DOCUMENTS

| | | |
|---|---|---|
| CN | 101887890 A | 11/2010 |
| CN | 102141222 A | 8/2011 |
| CN | 202110357 U | 1/2012 |
| CN | 202176976 U | 3/2012 |
| CN | 202253487 U | 5/2012 |
| CN | 102734761 A | 10/2012 |
| CN | 102767753 A | 11/2012 |
| JP | 2012-123338 A | 6/2012 |
| KR | 20060010224 A | 2/2006 |

* cited by examiner

BACKLIGHT MODULE AND LCD DEVICE

FIELD

The present disclosure relates to the field of liquid crystal displays (LCDs), and MOM particularly to a backlight module and an LCD device.

BACKGROUND

A typical liquid crystal display (LCD) device includes an LCD panel and a backlight module, and because the LCD panel is unable to emit light, a surface light source that evenly emits light should be provided by the backlight module. Generally, a lightbar is used as a light source of an edge-light backlight module. Because the lightbar emits additional heat, a lightbar heat sink is arranged to improve heat dissipation efficiency. Distance between a light emitting surface of the lightbar and a light incident surface of a light guide panel (LGP) is called light coupling distance and is a crucial optical parameter. When the light coupling distance is changed, optical performance of the backlight module is also changed. The light coupling distance should be strictly controlled to ensure optical quality of the backlight module. As shown in FIG. 1, in a typical method, a lightbar 1 is configured with a metal block 4, the metal block 4 is in contact with the light incident surface of the LGP 3, and a thickness of the metal block 4 is used to control the light coupling distance between the lightbar 1 and the LGP 3. However, because the metal block is fixed to the lightbar by a mount, disadvantages of the metal block include lower binding strength, unfirmness and easy disengagement when the backlight module is impacted by an outside force, thereby losing function of controlling the light coupling distance. In addition, because the lightbar is an electronic part, the lightbar is easy to deform when used as a structural part, thereby affecting the electrical properties.

SUMMARY

In view of the above-described problems, the aim of the present disclosure is to provide a backlight module and a liquid crystal display (LCD) device. When being impacted by large external force, the backlight module may still keep stable light coupling distance.

A first technical scheme of the present disclosure is that: a backlight module comprises a lightbar, a lightbar heat sink, and a light guide panel (LGP). A light coupling distance is set between the lightbar and the LGP. The backlight module further comprises a control structure controlling the light coupling distance. The lightbar is configured with a through hole, the control structure passes through the through hole and is arranged on the lightbar heat sink, and a fixing force that controls a position of the LGP is provided by the lightbar heat sink. The control structure comprises a body and a root, a cross section of the root is greater than a cross section of the body, and the root is clamped between the lightbar and the lightbar heat sink. Thermal tape is arranged between the lightbar and the lightbar heat sink, and height of the root of the control structure is greater than thickness of the thermal tape. A groove is disposed on the lightbar heat sink to receive the root of the control structure. A number of the control structure is two, the two control structures are distributed at two ends of the lightbar, and the control structure is a rigid plastic structure.

A second technical scheme of the present disclosure is that: a backlight module comprises a lightbar, a lightbar heat sink, and a light guide panel (LGP). A light coupling distance is set between the lightbar and the LGP. The backlight module further comprises a control structure controlling the light coupling distance. The lightbar is configured with a through hole, the control structure passes through the through hole, the control structure is arranged on the lightbar heat sink, and a fixing force that controls the LGP is provided by the lightbar heat sink.

In one example, the control structure comprises a body and a root, a cross section of the root is greater than a cross section of the body, and the root is clamped between the lightbar and the lightbar heat sink.

In one example, thermal tape is arranged between the lightbar and the lightbar heat sink, and height of the root of the control structure is equal to thickness of the thermal tape.

In one example, thermal tape is arranged between the lightbar and the lightbar heat sink, and height of the root of the control structure is greater than thickness of the thermal tape. A groove is disposed on the lightbar heat sink to receive the root of the control structure. If the height of the root of the control structure is greater than the thickness of the thermal tape, it is need to arrange a groove on the lightbar heat sink to receive the root of the control structure.

In one example, the control structure is a screw. The lightbar heat sink is configured with a threaded hole, and the control structure is in threaded connection to the threaded hole.

In one example, a body of the screw is configured with a step, a front end of the step is not configured with external threads, and a back end of the step is configured with the external threads.

In one example, the lightbar heat sink is configured with a through hole, and the root of the control structure passes through the through hole and then is riveted on the lightbar heat sink.

In one example, a number of the control structure is two, the two control structures are distributed at two ends of the lightbar to ensure uniformity of the light coupling distance between the lightbar and the LGP, thereby avoiding that the light coupling distance between two ends the lightbar and the LGP is wide and the light coupling distance between the other two ends the lightbar and the LGP is narrow.

In one example, a cross section of the control structure is circular. Because a revolving body is easy to manufacture, manufacturing cost is reduced.

In one example, the control structure is a metal structure or a rigid plastic structure.

The present disclosure further provides a third technical scheme: an LCD device comprising the backlight module mentioned above.

Advantages of the present disclosure are summarized below: because the control structure of the backlight module controlling the light coupling distance is arranged on the lightbar heat sink instead of being arranged on the lightbar, the fixing force is transferred to the lightbar heat sink so that the lightbar is not subjected to the fixing force that controls position of the LGP. The lightbar heat sink is generally made of aluminium extrusion process, has a determined thickness and high strength, and can bear a greater fixing force. Thus, the lightbar is not affected by external force, and is not easy to deform, thereby having no influence on electrical properties.

DETAILED DESCRIPTION

Figure 1:
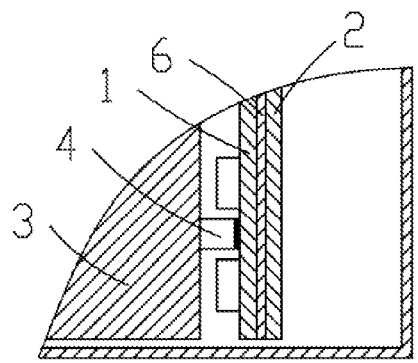
FIG. 1 is the structural diagram of a backlight module in the prior art.
Figure 2:
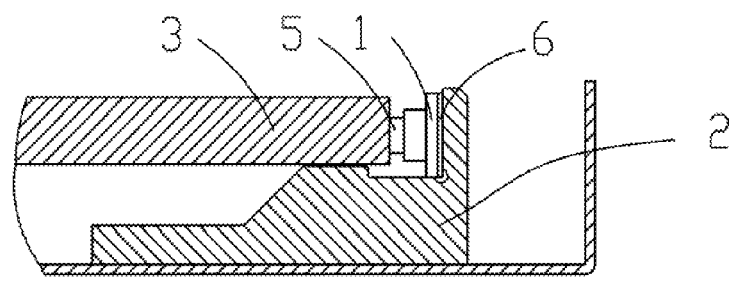
FIG. 2 is one sectional view of a first example of a backlight module of the present disclosure.
Figure 3:
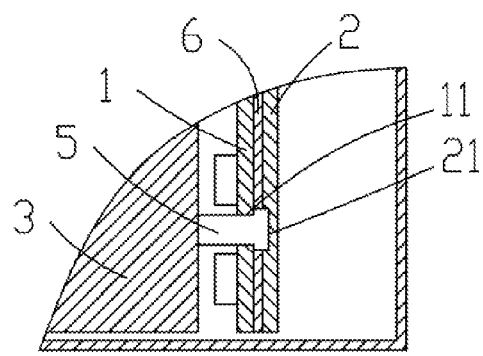
FIG. 3 is another sectional view of a first example of a backlight module of the present disclosure.
Figure 4:
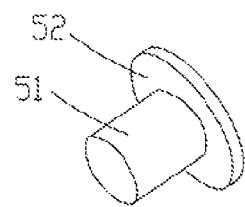
FIG. 4 is a structural diagram of a control structure shown in FIG. 2.

The present disclosure provides a liquid crystal display (LCD) device comprising a backlight module. FIG. 2-FIG. 4 show a first example of the backlight module of the present disclosure. The backlight module comprises a lightbar 1, a lightbar heat sink 4, and a light guide panel (LGP) 3. A light coupling distance is set between the lightbar 1 and the LGP 3. The backlight module further comprises a control structure 5 controlling the light coupling distance. The lightbar 1 is configured with a through hole 11, the control structure 5 passes through the through hole 11 and is arranged on the lightbar heat sink 2, and the lightbar heat sink 2 provides a fixing force that controls position of the LGP 3.

In the example, the control structure 5 comprises a body 51 and a root 52, a cross section of the root 52 is greater than a cross section of the body 51, and the root 52 is clamped between the lightbar 1 and the lightbar heat sink 2. When the backlight module is impacted, stability of the control structure is not affected. Length of the body 51 of the control structure 5 is equal to a sum of thickness of the lightbar 1 and the light coupling distance.

In the present disclosure, because the control structure 5 of the backlight module controlling the light coupling distance is arranged on the lightbar heat sink 2 instead of being arranged on the lightbar, the fixing force is transferred to the lightbar heat sink 2 so that the lightbar 1 is not subjected to the fixing force that controls position of the LGP 3. The lightbar heat sink 2 is generally made of aluminium extrusion process, has a determined thickness and high strength, and can bear a greater fixing force. Thus, the lightbar 1 is not affected by external force, and is not easy to deform, thereby having no influence on electrical properties.

Because the control structure 5 is arranged in the backlight module, the control structure 5 may be a metal structure or a rigid plastic structure. In the prior art, because mounts are used, only a metal block is used because the plastic structure may be melted in a soldering process.

In one example, there are two control structures 5, which are distributed at two ends of the lightbar 1 to ensure uniformity of the light coupling distance between the lightbar 1 and the LGP 3, thereby avoiding that the light coupling distance between two ends the lightbar 1 and the LGP 3 is wide and the light coupling distance between the other two ends the lightbar 1 and the LGP 3 is narrow. It should be understood that more than two control structures may be arranged, and the more than two control structures are evenly distributed along the lightbar. In addition, the cross section of the control structure 5 is circular. Because a revolving body is easy to manufacture, manufacturing cost may be reduced.

In the example, thermal tape 6 is arranged between the lightbar 1 and the lightbar heat sink 2. When a height of the root 52 of the control structure 5 is equal to a thickness of the thermal tape 6, the control structure 5 is assembled in the backlight module without changing structure of the lightbar heat sink 2. However, if the height of the root 52 of the control structure 5 is greater than the thickness of the thermal tape 6, a groove 21 is disposed on the lightbar heat sink 2 to receive the root 52 of the control structure 5.

Figure 5:
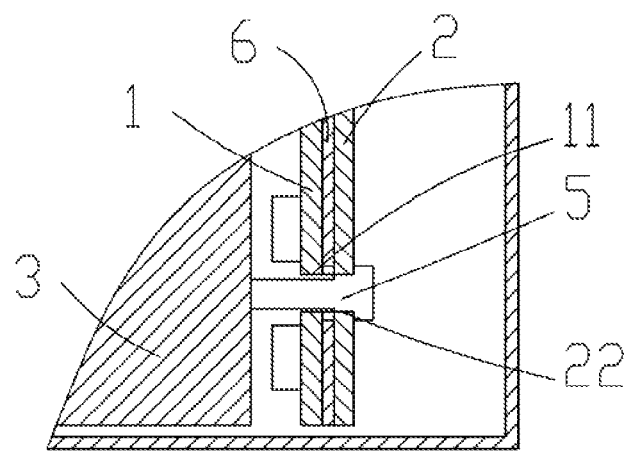
FIG. 5 is a sectional view of a second example of a backlight module of the present disclosure.
Figure 6:
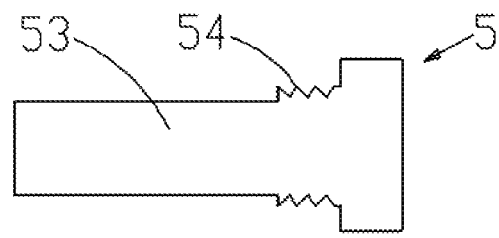
FIG. 6 is a structural diagram of a control structure shown in FIG. 5.

FIG. 5 and FIG. 6 show a second example of the backlight module of the present disclosure, and the second example is different from the first example in that: the control structure 5 is a screw, the lightbar heat sink 2 is configured with a threaded hole 22, and the control structure 5 is in threaded connection to the threaded hole 22.

In the example, a body of the screw is configured with a step, and a front end of the step 53 passes through the lightbar heat sink 2 and the lightbar 1. Thus, external threads are not needed on the front of the step. If the external threads are arranged at the front end of the step 53, a sharp of a tail end of the threads may be in direct contact with the LGP 3, thereby damaging the LGP 3. A back end of the step 54 is configured with the external threads used to be in threaded connection to the threaded hole 22 of the lightbar heat sink. Other structures and advantages of the second example are coincident with other structures and advantages of the first example; thus, the example will not give unnecessary details.

In the example, the control structure may be riveted on the lightbar heat sink as well. The root of the control structure passes through the through hole and then is riveted on the lightbar heat sink, thereby achieving the same beneficial effect.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong, to the protection scope of the present disclosure.

I claim:

1. A backlight module, comprising:
a lightbar;
a lightbar heat sink;
a light guide panel (LGP), wherein a light coupling distance is set between the lightbar and the LGP; and
two control structures controlling the light coupling distance;
wherein the lightbar is configured with a through hole, the control structures pass through the through hole and are arranged on the lightbar heat sink, and wherein the lightbar heat sinks provides a fixing force that controls a position of the LGP; wherein the control structures comprise a body and a root, a cross section of the root is greater than a cross section of the body, and the root is clamped between the lightbar and the lightbar heat sink; thermal tape is arranged between the lightbar and the lightbar heat sink, a height of the root of the control structure is greater than a thickness of the thermal tape; a groove is disposed on the lightbar heat sink to receive the root of the control structure; the two control structures are distributed at two ends of the lightbar, and the control structures are rigid plastic structures.

2. A backlight module, comprising:
a lightbar;
a lightbar heat sink;
a light guide panel (LGP), wherein a light coupling distance is set between the lightbar and the LGP; and
a control structure controlling the light coupling distance;
wherein the lightbar is configured with a through hole, the control structure penetrating through the through hole is arranged on the lightbar heat sink, and wherein the lightbar heat sink provides a fixing force that controls a position the LGP, wherein the control structure comprises a body and a root, a cross section of the root is greater than a cross section of the body, and the root is clamped between the lightbar and the lightbar heat sink.

3. The backlight module of claim 2, wherein thermal tape is arranged between the lightbar and the lightbar heat sink, and a height of the root of the control structure is equal to a thickness of the thermal tape.

4. The backlight module of claim 2, wherein thermal tape is arranged between the lightbar and the lightbar heat sink, and a height of the root of the control structure is greater than a thickness of the thermal tape; a groove is disposed on the lightbar heat sink to receive the root of the control structure.

5. The backlight module of claim 2, wherein the control structure is a screw, the lightbar heat sink is configured with a threaded hole, and the control structure is in threaded connection to the threaded hole.

6. The backlight module of claim 5, wherein a body of the screw is configured with a step, and external threads are not needed on a front end of the step, a back end of the step is configured with the external threads.

7. The backlight module of claim 2, wherein the lightbar heat sink is configured with a through hole, and a root of the control structure passes through the through hole and then is riveted on the lightbar heat sink.

8. The backlight module of claim 2, wherein a number of the control structure is two, and the two control structures are distributed at two ends of the lightbar.

9. The backlight module of claim 2, wherein the control structure is a metal structure or a rigid plastic structure.

10. A liquid crystal display (LCD) device, comprising:
a backlight module, wherein the backlight module comprises a lightbar, a lightbar heat sink, and a light guide panel (LGP); a light coupling distance is set between the lightbar and the LGP; wherein the backlight module further comprises a control structure controlling the light coupling distance; the lightbar is configured with a through hole, the control structure penetrating through the through hole is arranged on the lightbar heat sink, and the lightbar heat sink provides a fixing force that controls a position of the LGP, wherein the control structure comprises a body and a root, a cross section of the root is greater than a cross section of the body, and the root is clamped between the lightbar and the lightbar heat sink.

11. The liquid crystal display (LCD) device of claim 10, wherein thermal tape is arranged between the lightbar and the lightbar heat sink, and a height of the root of the control structure is equal to a thickness of the thermal tape.

12. The liquid crystal display (LCD) device of claim 10, wherein thermal tape is arranged between the lightbar and the lightbar heat sink, and a height of the root of the control structure is greater than a thickness of the thermal tape; a groove is disposed on the lightbar heat sink to receive the root of the control structure.

13. The liquid crystal display (LCD) device of claim 10, wherein the control structure is a screw; the lightbar heat sink is configured with a threaded hole, and the control structure is in threaded connection to the threaded hole.

14. The liquid crystal display (LCD) device of claim 13, wherein the body of the screw is configured with a step, and external threads are not needed on a front end of the step, a back end of the step is configured with the external threads.

15. The liquid crystal display (LCD) device of claim 10, wherein the lightbar heat sink is configured with a through hole, a root of the control structure passes through the through hole and then is riveted on the lightbar heat sink.

16. The liquid crystal display (LCD) device of claim 10, wherein a number of the control structure is two, and the two control structures are distributed at two ends of the lightbar.

17. The liquid crystal display LCD) device of claim 10, wherein the control structure is a metal structure.

18. The liquid crystal display (LCD) device of claim 10, wherein the control structure is a rigid plastic structure.

\* \* \* \* \*